(12) United States Patent
Smolka et al.

(10) Patent No.: US 11,956,540 B2
(45) Date of Patent: Apr. 9, 2024

(54) TILTABLE FOLD MIRROR FOR AN OPTICAL IMAGING SYSTEM

(71) Applicant: Optotune AG, Dietikon (CH)

(72) Inventors: Stephan Smolka, Zürich (CH); Michael Büeler, Vogelsang (CH); Sanggyu Biern, Zürich (CH); Johannes Haase, Ennetbaden (CH)

(73) Assignee: Optotune Switzerland AG, Dietikon (CH)

( * ) Notice: Subject to any disclaimer, the term of this patent is extended or adjusted under 35 U.S.C. 154(b) by 353 days.

(21) Appl. No.: 17/418,894

(22) PCT Filed: Dec. 20, 2019

(86) PCT No.: PCT/EP2019/086857
§ 371 (c)(1),
(2) Date: Jun. 28, 2021

(87) PCT Pub. No.: WO2020/136144
PCT Pub. Date: Jul. 2, 2020

(65) Prior Publication Data
US 2022/0070350 A1 Mar. 3, 2022

(30) Foreign Application Priority Data
Dec. 28, 2018 (EP) .................................... 18248274

(51) Int. Cl.
*H04N 23/68* (2023.01)
*G02B 26/08* (2006.01)
(Continued)

(52) U.S. Cl.
CPC ....... *H04N 23/685* (2023.01); *G02B 26/0816* (2013.01); *H04N 23/54* (2023.01); *H04N 23/55* (2023.01)

(58) Field of Classification Search
CPC ...... H04N 23/685; H04N 23/54; H04N 23/55; G02B 26/0816; G02B 26/085; G02B 27/64; G02B 7/182; G02B 7/1821
See application file for complete search history.

(56) References Cited

U.S. PATENT DOCUMENTS

2015/0042870 A1* 2/2015 Chan .................. H04N 23/69
359/733
2017/0082827 A1 3/2017 Park
(Continued)

FOREIGN PATENT DOCUMENTS

CN 101281295 10/2008
CN 103439850 12/2013
(Continued)

*Primary Examiner* — Gevell V Selby
(74) *Attorney, Agent, or Firm* — JMB Davis Ben-David

(57) ABSTRACT

The invention relates to a tiltable mirror (1) for optical image stabilization in an optical imaging system (100), the tiltable mirror (1) comprising—a rigid mirror substrate (1S) with a planar reflective layer (1R) on a front side of the mirror substrate (1S) for reflecting incident light (500) in an optical imaging system (100), —a mirror frame (1F), wherein the mirror substrate (1S) is arranged tiltably in the mirror frame (1F), —an actuator (2) for tilting the mirror substrate (1S) around a primary (x) and a secondary (y) tilt axis with respect to the mirror frame (1F). The invention further relates to an optical imaging system comprising a tiltable mirror (1) according to the invention.

20 Claims, 8 Drawing Sheets

(51) Int. Cl.
  *H04N 23/54* (2023.01)
  *H04N 23/55* (2023.01)

(56) References Cited

U.S. PATENT DOCUMENTS

| | | | |
|---|---|---|---|
| 2017/0329111 A1 | 11/2017 | Hu | |
| 2018/0217475 A1* | 8/2018 | Goldenberg | H04N 23/68 |
| 2018/0231793 A1 | 8/2018 | Jeong | |
| 2019/0104239 A1* | 4/2019 | Aschwanden | H04N 23/55 |
| 2019/0121103 A1* | 4/2019 | Bachar | H04N 23/685 |

FOREIGN PATENT DOCUMENTS

| | | |
|---|---|---|
| WO | 2015192914 | 12/2015 |
| WO | 2018138349 | 8/2018 |
| WO | 2018158590 | 9/2018 |

\* cited by examiner

State of the art

TILTABLE FOLD MIRROR FOR AN OPTICAL IMAGING SYSTEM

CROSS-REFERENCE TO RELATED APPLICATIONS

This is the U.S. National Stage of International Patent Application No. PCT/EP2019/086857 filed on Dec. 20, 2019, which claims priority to European Patent Application No. 18248274.5 filed on Dec. 28, 2018.

The invention relates to a tiltable and adjustable fold mirror for an optical imaging system for optical image stabilization as well as to an optical imaging system comprising said mirror.

Optical imaging systems comprise an image sensor, a lens system for example comprised in a rigid lens barrel and a fold prism.

Such optical imaging systems are often comprised in compact handheld devices, such as mobile phones, mobile computers with a camera, where space for components is typically very limited and often required to have the optical path folded by one or more fold prisms.

Optical image stabilization in such system is achieved by either actively or passively moving (as indicated by the solid black arrows) selected components of the imaging system so that an incident light ray is projected to the same position of the image sensor even though the image sensor is moved, e.g. due to a shaking motion of a person holding the imaging system.

Usually either the fold prism is tilted or the lens barrel with the lens system is moved transversally to the optical path (indicated by hollow arrows) in order to achieve image stabilization.

There are advantages to tilt the fold prism, as the fold prism has a solid portion e.g. consisting of glass having a higher refractive index than air, thus confining the incident light rays to a higher degree allowing the optical system to be built more compact.

Moreover, tilting the prism is more advantageous than translating the lens barrel, as for each degree the prism is tilted, the incident light is deflected by twice of said tilt angle, allowing for smaller tilt angles of the prism. For a translational movement of the lens barrel this relation does not apply.

However, for actuation the whole prism has to be tilted, which requires higher actuation forces and a larger building space for the tiltable prism. This in turn leads to a higher energy consumption of the image stabilization system.

An object of the invention is to provide a device that addresses these drawbacks particularly for optical imaging systems having a comparable small field of view. Another object of the invention is to provide a device that allows for rapid, reliable and precise assembly of optical imaging systems with optical image stabilization capability. Moreover, it is an object of the present invention to provide a device with a high light collection efficiency while omitting wavefront aberrations.

At least one object is achieved by the tiltable mirror having the features of claim 1.

Advantageous embodiments are described in the sub-claims.

According to claim 1, a tiltable mirror for optical image stabilization in an optical imaging system comprises the following components, a rigid mirror substrate with a planar reflective layer on a front side for reflecting incident light towards an optical imaging system, a mirror frame, wherein the mirror substrate is arranged tiltably in the mirror frame, an actuator for tilting the mirror substrate around a primary and a secondary tilt axis with respect to the mirror frame.

The term "tiltable" or "tiltably" particularly refers to the property of the mirror or the tiltable component to be rotatable about an axis to some degree. The term "tiltable mirror" refers to a mirror device that comprises at least a tiltable reflective surface.

The degree of tilt is particularly within ±5°.

An optical imaging system is an optical system that is configured to project images of its surrounding on an images sensor. An optical axis can be defined for the imaging system, wherein said optical axis is particularly given by a lens or imaging mirror system comprised by the imaging system.

The tiltable mirror is particularly comprised in such an optical system, wherein the tiltable mirror particularly is arranged as a fold mirror, folding the optical axis of the imaging system.

This allows for a compact design of the imaging system.

Therefore, according to another embodiment of the invention, the tiltable mirror is a fold mirror of an optical imaging system.

The planar reflective layer of the mirror particularly comprises a planar reflective metal compound such as silver, gold or a dielectric layer.

The reflective layer is particularly formed as a mirror surface.

The reflective layer can be covered particularly by a protective compound such as glass or a transparent plastic or polymer. The surface-air interface of the protective compound is parallel to the reflective mirror surface, i.e. parallel to the reflective layer.

The reflective layer is tiltable arranged with respect to the mirror frame that provides a fixed frame of reference to the mirror frame. Any tilt of the mirror substrate can be determined against the mirror frame.

In order to enable image stabilization, the mirror comprises an actuator for tilting the mirror substrate (and thus the reflective layer) around a primary and a secondary tilt axis with respect to the mirror frame.

The primary and secondary axes are particularly orthogonal to each other.

The term "primary" and "secondary" is solely for distinguishing purposes for the tilt axes.

In order to be suited for image stabilization applications the actuator has to provide a sufficiently fast response time such that compensation of a motion is achieved with minimal lag.

One significant difference between a mirror and a prism is that a mirror might comprise a protective coating on its reflective layer, said coating having a coating-air interface that extends parallel to the reflective layer of the mirror, wherein a prism has a body exhibiting prism-air interface that enclose an angle with the reflective portion of the prism.

In case the mirror does not have a protective coating on its reflective layer, the difference between the mirror and the prism is even more obvious, as the prism comprises a solid transparent body arranged on the reflective surface of the prism, wherein said body comprises at least one surface that encloses an angle within reflective portion of the prism.

According to another embodiment of the invention, the actuator is a piezo-electric actuator or a shape memory alloy actuator, a voice coil actuator, based on Lorentz force, or a reluctance actuator.

According to another embodiment of the invention, the actuator comprises at least one permanent magnet rigidly arranged on a back side of the mirror substrate extending opposite of the front side of the mirror substrate, and a plurality of actuation coils, particularly four actuation coils, for tilting the mirror substrate around the primary and the secondary axis, such that the actuator can generate a Lorentz force for tilting the mirror substrate.

The at least one magnet has a magnetization, particularly wherein the magnetization is oriented along a direction orthogonal to the primary and secondary axis.

Other components can be arranged between the at least one magnet and the mirror substrate, such as for example a component from a gimbal for tilting the mirror substrate.

The actuation coils are rigidly attached to the mirror frame or comprised by or attached to a component, such as a printed circuit board that is rigidly attached to the mirror frame.

An actuator that actuates by means of Lorentz force is also referred to as a voice coil actuator.

In the context of the current specification the term "magnet" particularly relates to a magnet configured and arranged for actuation.

In the context of the current specification for reasons of intelligibility the "actuation coils" are sometimes referred to as "coils" only.

The term "coil" in the context of the current specification particularly refers to an electrically conducting structure that is configured to generate a magnetic field suitable and configured for titling the mirror substrate. Therefore, whether a structure is considered a coil or not in the context of the current specification depends solely on the function of the structure, i.e. if the structure is used to induce a Lorentz force in the at least one magnet for tilting the mirror substrate. The latter structure is considered a coil within the meaning of the invention.

According to another embodiment of the invention, the at least one magnet is centered at an intersection of the primary and the secondary axis.

This allows for a controlled actuation of the mirror substrate.

According to another embodiment of the invention, the plurality of actuation coils comprises at least a first primary actuation coil arranged for tilting the mirror substrate at least around the primary axis, and at least a first secondary actuation coil arranged for tilting the mirror substrate at least around the secondary axis.

According to one embodiment, the first primary actuation coil can be arranged such on the mirror frame that it affects an actuation solely about the primary axis.

According to another embodiment, the first primary actuation coil can be arranged on the mirror frame such on the mirror frame that it affects an actuation about the primary axis and the secondary axis.

Similarly, according to one embodiment, the first secondary actuation coil can be arranged such on the mirror frame that it affects an actuation solely about the secondary axis.

According to another embodiment, the first secondary actuation coil can be arranged such on the mirror frame that it affects an actuation about the primary axis and the secondary axis.

The term "primary" and "secondary" is purely for reasons of distinction and is not connected to an order or a sequence.

According to another embodiment of the invention, the first primary coil is arranged laterally shifted with respect to the primary axis on the mirror frame and wherein the first secondary actuation coils is arranged laterally shifted with respect to the secondary axis on the mirror frame.

This configuration allows for an actuation of the mirror substrate about the primary axis by only the first primary coil and an actuation of the mirror substrate about the secondary axis by only the first secondary coil.

The Lorentz force generated by the two coils is translated to a torque yielding a tilting of the mirror.

According to another embodiment of the invention, the actuator comprises a second primary actuation coil and a second secondary actuation coil, wherein the second primary actuation coil is arranged for tilting the mirror substrate at least around or only the primary axis and wherein the second secondary actuation coil is arranged for tilting the mirror substrate at least or only around the secondary axis, wherein the second primary actuation coil is arranged opposite of and particularly parallel to the first primary coil on the mirror frame, particularly laterally shifted from the primary axis, wherein the second secondary actuation coil is opposite of and particularly parallel to the first secondary actuation coil and particularly arranged laterally shifted from the secondary axis on the mirror frame.

This embodiment provides complementary primary and secondary coils such that particularly a symmetric control and force design is achieved.

The first and the second primary coil are particularly arranged within a plane extending parallel to the primary and the secondary axis.

The first and the second secondary coil are particularly arranged within a plane extending parallel to the primary and the secondary axis, wherein said plane is particularly different to the plane within which the first and the second primary coil are arranged.

This allows for a compact design of the tiltable mirror and extended coils.

According to another embodiment of the invention, the first and the second primary actuation coils are arranged symmetrically in a plane extending parallel the secondary and the primary axis, particularly axially symmetrical, particularly symmetrical around the primary axis and/or wherein the first and the second secondary actuation coils are arranged symmetrically in a plane extending parallel to the secondary and the primary axis, particularly axially symmetrical, particularly symmetrical around the secondary axis.

The planes for the primary coils and the secondary coils can be different planes.

According to another embodiment of the invention, the actuation coils are arranged on a back side of the mirror frame for example on a printed circuit board are integrated in a printed circuit board. The back side of the mirror frame is particularly a side facing away (with its surface normal) from the reflective layer (i.e. its surface normal) and that is arranged on the side of the mirror substrate that is opposite the front side of the mirror substrate.

According to another embodiment of the invention, the actuation coils are arranged such that the actuation coils superimpose the at least one magnet at least partially.

Thus, in a projection of coils contour on the at least one magnet along a third axis orthogonal to the primary and the secondary axis the projected coils contours are overlapping with the contour of the at least one magnet.

According to another embodiment of the invention, in case more than one actuation magnet is comprised by the mirror, each coil overlaps with at least one magnet.

According to another embodiment of the invention, the tiltable mirror comprises a plurality of magnets rigidly arranged on the back side of the mirror substrate, the magnets configured for actuating the mirror substrate by means of a Lorentz force.

Each magnet has a magnetization, particularly wherein the magnetization of each magnet is oriented along a direction orthogonal to the primary and secondary axis. The orientations of the magnets can point in opposite or the same directions.

Other components can be arranged between the magnets and the mirror substrate, such as for example a component from a gimbal for tilting the mirror substrate.

According to another embodiment of the invention, the plurality of magnets comprises a first and a second primary magnet as well as a first and a second secondary magnet, wherein the first primary magnet is arranged laterally shifted with respect to the primary axis on the mirror substrate, wherein the second primary magnet is arranged laterally shifted to the primary axis and opposite of the first primary magnet, wherein the first secondary magnet is arranged laterally shifted with respect to the secondary axis on the mirror substrate, wherein the second secondary magnet is arranged laterally shifted to the secondary axis and opposite of the first secondary magnet, each magnet having associated a corresponding actuation coil arranged on the mirror frame.

This embodiment allows for a symmetric design and symmetric actuation forces on the magnets.

According to another embodiment of the invention, the magnets are arranged symmetrically to each other, particularly wherein the first and the second primary magnet are arranged axially symmetric—particularly with respect to the primary axis—to each other in a plane extending parallel to the primary and the secondary axis, particularly wherein the first and second secondary magnets are arranged axially symmetric—particularly with respect to the secondary axis—to each other to each other in a plane extending parallel to the primary and the secondary axis.

This embodiment allows for symmetric force generation and a symmetric torque generation on the mirror substrate.

According to another embodiment of the invention, the first primary actuation coil is arranged on the mirror frame opposite the first primary magnet that is arranged on the mirror substrate and/or on a gimbal component such as the central or the first part of the two-axis gimbal, the second primary actuation coil is arranged on the mirror frame opposite the second primary magnet that is arranged on the mirror substrate and/or on a gimbal component such as the central or the first part of the two-axis gimbal, the first secondary actuation coil is arranged on the mirror frame opposite the first secondary magnet that is arranged on the mirror substrate and/or on a gimbal component such as the central or the first part of the two-axis gimbal, and/or the second secondary actuation coil is arranged on the mirror frame opposite the second secondary magnet that is arranged on the mirror substrate and/or on a gimbal component such as the central or the first part of the two-axis gimbal.

The term "arranged on" particularly refers to embodiments where the coils are attached to another component, such as a printed circuit board that is attached to the mirror frame. Thus, the term "arranged on" also includes embodiments where the coils do not have to be arranged or attached directly to the mirror frame. The same applies to the magnets.

According to this embodiment, the coils are arranged on the fixed portion, i.e. the mirror frame, of the mirror, wherein the magnets are arranged on a tiltable portion of the mirror.

The term "opposite" refers to an arrangement, where each magnet is particularly at least partially overlapping with corresponding coil along the third axis as elaborated above.

According to another embodiment of the invention, the mirror substrate is arranged on a two-axis gimbal connected to the mirror frame allowing for independently tilting the mirror substrate in the mirror frame around the primary and the secondary axis.

A gimbal is particularly a device comprising at least one rotatable or tiltable portion for rotating or tilting a component arranged or integrated in the gimbal relative to frame the gimbal is arranged in.

For the mirror according to the invention, the gimbal is configured to tilt the mirror substrate and thus the reflective layer about the primary and the secondary axis particularly within a range of −5° to 5° such as to provide image stabilization to an optical imaging system.

The two-axis is referred to in the context of the current specification also as "gimbal" only.

The tiltable mirror is thus an adjustable, tiltable mirror.

According to another embodiment of the invention, the two-axis gimbal comprises a spring means that comprises a central part that comprises ort is attached to the mirror substrate, wherein the central part is integrally connected to a circumferential first part surrounding the central part such that the central part can be tilted about the primary axis with respect to the first part, and wherein the first part is integrally connected to a circumferential second part surrounding the first part so that the first part together with the central part can be tilted with respect to the second part about the secondary axis, particularly wherein the second part is particularly connected to the mirror frame.

The spring means is configured to generate a restoring force on the central and/or first part of the gimbal such that the respective part once tilted from an equilibrium position moves back in the equilibrium position when an actuation force from the actuator ceases.

The central part, the first part and the second part are particularly planar and particularly extend within the same plane, when no actuation force is applied to the gimbal.

The equilibrium position of the gimbal is particularly the position in which the central, the first and the second part extend within said common plane. This common equilibrium plane extends particularly parallel to the reflective layer of the mirror.

The mirror substrate can be arranged on a front side of the central part, wherein the at least one magnet is arranged on a back side of the central part. The back side faces away (with its surface normal) from the reflective layer, wherein the front side of the central part faces towards (with the surface normal) the reflective layer.

The spring means provides a control to the tiltable mirror with respect to the tilt axis that is assumed when the actuation force ceases, therefore providing a self-adjusting tiltable mirror.

According to another embodiment of the invention, the first and the second primary magnets are arranged on the central part, wherein the first and the second secondary magnets are arranged on the first part.

According to another embodiment of the invention, the spring means comprises four spring arms, wherein each spring arm is configured to generate a restoring force when a torque is applied to the spring arm, wherein two primary arms connect the central part of the two-axis gimbal with the first part of the gimbal, wherein the two primary arms extend along and on the primary axis rendering the central part tiltable about said primary arms, wherein two secondary arms connect the first part with the second part of the two-axis gimbal, wherein the two secondary arms extend along and on the secondary axis, rendering the first and the central part tiltable about said secondary arms.

This embodiment particularly provides a gimbal that is particularly a spring being flexible around the primary and the secondary axis.

According to another embodiment of the invention, the central part, the first part and the second part, and particularly the four spring arms are integrally formed with each other, particularly from a metal sheet.

This embodiment allows for a robust and integrated solution for a tiltable mirror, with a gimbal automatically providing restoring forces when an actuation force ceases.

According to another embodiment of the invention, the two-axis gimbal, particularly comprising the four spring arms, the central part, the first part and the second part, comprises a metal compound or consists of a metal compound.

According to another embodiment of the invention, the mirror, particularly the two-axis gimbal comprises a resonance frequency below 5 Hz or above 30 Hz.

In handheld optical devices such as mobile phones or mobile handheld computers with a camera or an optical imaging system the common shaking motion of the person holding the device is around 10 Hz. This embodiment allows a good control of the tiltable mirror well outside the resonance frequency.

According to another embodiment of the invention, the central part of the two-axis gimbal has a circular outer circumference.

According to another embodiment of the invention, the first part has an elliptical, rhombic or an oval outer circumference, particularly wherein the main axes of the ellipse, the rhombus or the oval align with the primary and the secondary spring arms, particularly wherein the first part encloses a circular area within which the central part is arranged.

According to another embodiment of the invention, the second part has a rectangular outer circumference adapted to be attached to the mirror frame.

This embodiment allows a rapid assembly of the gimbal and mirror without extra components to adapt the gimbal to the mirror frame.

According to another embodiment of the invention, the rectangular outer circumference of the second part has a first axis of extend of the rectangle extending along two parallel sides of the rectangular circumference and a second axis orthogonal to the first axis, wherein the primary axis and the secondary axis, and particular the four spring arms of the two-axis gimbal are arranged at an angle with respect to the first and the second axis.

Said axes of extend are aligned with or parallel to the sides of the rectangle.

This embodiment allows a compact and particularly a tiltable mirror that has at least one particularly short side, allowing for a slim design of the mirror and thus the optical imaging system.

According to another embodiment of the invention, the rectangular outer circumference of the second part has a first axis of extend of the rectangle extending along two parallel sides of the rectangular contour and a second axis orthogonal to the first axis, wherein the primary axis and the secondary axis, and particular the four spring arms of the gimbal are aligned with the first and the second axis.

This design allows a compact design with the axes of the gimbal in alignment with the mirror frame geometry.

According to another embodiment of the invention, the tiltable mirror comprises a first and a second magnetic field sensor, particularly a first and a second hall sensor, wherein the magnetic field sensors are arranged on the mirror frame or on or in a printed circuit board, wherein the first magnetic field sensor is arranged laterally shifted with respect to the primary axis, wherein the second magnetic field sensor is shifted with respect to the secondary axis.

The magnetic sensors allow a closed-loop operation of the tiltable mirror in an optical system, as control signals provided to the actuator can be referenced against the sensor signals from the magnetic sensors.

The magnetic sensors are particularly configured to provide a sensor signal indicative of the mirror substrate position or its tilt angle.

Each of the two sensors is particularly sensitive to one of the tilt axes or to a tilt around two independent axes in the plane extending between the primary and secondary plane.

According to another embodiment of the invention, the first and the second magnetic field sensor are arranged laterally shifted with respect to the actuation coils.

This arrangement of the sensor allows for a reduced influence of the magnetic field registered by the sensors generated by the actuation coils.

According to another embodiment of the invention, the first and the second magnetic field sensor are each arranged such with respect to the at least one magnet and the actuation coils that a magnetic field strength, particularly a magnetic flux registered by the first and/or the second magnetic field sensor originates by more than 80%, particularly more than 90%, more particularly more than 95% from the at least one magnet, particularly from the four magnets, particularly wherein less than 20%, more particularly less than 10%, more particularly less than 5% of the registered magnetic field strength originates from the actuation coils, when the mirror substrate is tilted 0.5° with respect to an equilibrium position around the primary or the secondary axis.

This embodiment allows precise positon estimation of the mirror substrate with the magnetic sensors.

According to another embodiment of the invention, the first magnetic field sensor is configured to provide sensor data indicative of, particularly proportional, related or linear to a tilt angle of the mirror substrate with respect to the mirror frame around the primary axis, wherein the second magnetic field sensor is configured to provide sensor data indicative of, particularly proportional, related or linear to a tilt angle of the mirror substrate with respect to the mirror frame around the secondary axis.

According to another embodiment of the invention, the tiltable mirror comprises a printed circuit board arranged at the mirror frame, wherein the printed circuit board particularly comprises the actuation coils and particularly the first and the second magnetic field sensor, wherein the printed circuit board is particularly configured to control the electric current provided to the actuation coils and to determine sensor data from the magnetic field sensors.

The printed circuit board can integrally comprise the actuation coils. The printed circuit board can have contact pins for contacting the electric components on the circuit board.

The use of a circuit board allows for pre-manufacturing and pre-assembling of the coils and all electric components such that during assembly of the mirror only one assembly step is necessary.

According to another embodiment of the invention, the reflective layer is rectangular. This allows for a higher relative illumination intensity reflected to the optical system as compared to other geometries such as oval, elliptical or circular geometries.

According to another embodiment of the invention, the mirror substrate has a rectangular outer contour in the plane defined by the primary and the secondary axis.

This allows for the integration in rectangular mirror frame geometries.

According to another embodiment of the invention, the rectangular reflective layer and/or the rectangular outer contour of the mirror substrate have first axis along a first side along of the rectangular reflective layer and/or the rectangular contour and a second axis along a second side orthogonal to the first side, wherein the primary and the secondary axis are arranged at an angle with respect to the first and second axis, particularly wherein the angle is not 90° or multiples thereof. Particularly, said angle is greater than 10° and smaller than 80° This embodiment provides a compact design of the mirror.

According to another embodiment of the invention, the mirror frame is formed as a mirror housing, wherein the mirror frame has an inlet wall member with an inlet aperture on a side facing incident light to be registered by an optical system, wherein the mirror frame has an outlet wall member with an outlet aperture on a side facing the reflected incident light of the mirror particularly towards an optical imaging system, wherein the housing comprises two lateral side walls connecting the inlet and the outlet wall members, particularly wherein the reflective layer is arranged at an angle with respect to the inlet aperture and the outlet aperture, particularly wherein said angle is within 30° to 60°, more particularly wherein said angle 45°.

In one embodiment the mirror frame is shaped as a cube that is cut along a diagonal plane or a diagonally shifted plane. Said plane is the plane within which the reflective layer is arranged and particularly also the gimbal, the printed circuit board and other components used for controlling the mirror substrate. The wall member with the inlet aperture and the wall member with the outlet aperture meet particularly at an angle of 90° such the inlet aperture and the outlet aperture enclose an angle of 90°.

The side walls are particularly light-absorbing. The wall member comprising the inlet aperture can be formed as connecting frame portions for the aperture. Also, the wall member comprising the outlet aperture can be formed as frame portions.

According to another embodiment of the invention, the inlet aperture of the mirror frame has a rectangular contour forming a rectangular opening.

This embodiment can be combined with a rectangular reflective layer, such that the full reflective layer surface is provided with incident light. This embodiment allows for a particularly high light collection.

According to another embodiment of the invention, the outlet aperture of the mirror frame has a circular contour forming a circular opening.

According to another embodiment of the invention, the mirror frame comprises protrusions and/or recesses for attaching the two-axis gimbal to the mirror frame, such that the two-axis gimbal is attached in a position to the mirror frame that is defined by the protrusions and/or recesses.

This embodiment allows for the attachment of the gimbal to the mirror frame in a single predefined position allowing for a rapid and reliable assembly of the mirror.

According to another embodiment of the invention, at least one protrusion of the mirror frame for attaching the two-axis gimbal is formed as a pin, particularly wherein the protrusions consist of four pins extending along a perpendicular direction to the primary and the secondary axis, wherein the two-axis gimbal comprises at least one, particularly four corresponding recesses or holes having received said pins.

According to another embodiment of the invention, the mirror frame comprises protrusions and/or recesses for attaching the printed circuit board in a predefined position to the mirror frame.

This embodiment contributes to the modular intention that all components of the tiltable mirror can be assembled with minimum amount of alignment with highest precision.

According to another embodiment of the invention, at least one of the protrusions of the mirror frame for attaching the printed circuit board is formed as a pin, particularly wherein the protrusions consist of four pins extending along a perpendicular direction to the primary and the secondary axis, wherein the printed-circuit board comprises at least one, particularly four corresponding recesses or holes having received said pins.

According to another embodiment of the invention, the mirror frame comprises at least two, particularly four hard stops for limiting a tilt angle about the primary or the secondary axis of the mirror substrate, and particularly the gimbal, the central part, and/or the first part particularly wherein the hard stops are integrally formed to the mirror frame.

This embodiment renders the mirror more robust against mechanical shock and strong vibrations, rendering the mirror more durable.

According to another embodiment of the invention, the mirror frame comprises protrusions at the outlet aperture for attaching the mirror to an optical system having corresponding recesses, such that the mirror is attachable to the optical system in a predefined position and orientation, particularly in one predefined position and orientation only.

The invention also relates to an optical imaging system comprising the mirror according to the invention, the optical imaging system being configured for optical image stabilization.

The additional aspect relates to an optical imaging system, comprising the tiltable mirror as a fold mirror according to at least one embodiment according to the invention, an image sensor and a lens system for imaging with an optical axis defining an optical axis of the imaging system, wherein the lens system is arranged in front of the image sensor with a first side and wherein the adjustable tiltable mirror is arranged at a second side of the lens system opposite the first side, wherein the optical axis of the imaging system is folded by the tiltable mirror.

The image sensor is particularly a pixel-based images sensor with as plurality of photosensitive pixels arranged in an array.

The optical system can be built very compact and be integrated in a mobile hand held device such as a mobile phone or a mobile computer.

The tiltable fold mirror is particularly the last component of the optical imaging system, i.e. it is the first component of the imaging system receiving incident light.

In front of the mirror a protective device can be arranged, such as a planar glass or polymer window.

The optical system does not suffer from optical distortions introduced by a fold prism.

The actuator can be part of a closed-loop system, for controlling and checking the position of the tiltable mirror.

According to another embodiment of the invention, the tiltable mirror is configured to tilt the reflective layer in response to a movement of the optical imaging system such that an incident ray of light maintains its projected position on the image sensor thereby providing optical image stabilization to the optical imaging system.

This embodiment allows for optical image stabilization facilitated by the fold mirror.

According to another embodiment of the invention, the optical imaging system comprises at least one lens that has an adjustable focal length, wherein said lens comprises a container filled with a transparent fluid, wherein the container comprises an elastically deformable and transparent membrane facing a transparent bottom portion of the container.

This embodiment allows for a robust stabilized optical imaging system, such as a zoom-, a tele-, a wide-angle or macro-imaging system, without a translational movable optical component, allowing a very compact and robust design.

According to another embodiment of the invention, the imaging system comprises a motion detection system for detecting a movement of the optical system, wherein said motion detection system is configured to generate a motion signal indicative of the motion and its direction, wherein the optical imaging system further comprises a control electronic, particularly arranged on the printed circuit board of the tiltable mirror, wherein said control electronic is configured to generate a control signal for controlling a tilt position of the reflective layer of the tiltable mirror, said control signal being configured to tilt the reflective layer, particularly the mirror substrate on the gimbal in response to a movement of the optical imaging system such that an incident ray of light maintains its projected position on the image sensor.

There is a plurality of motion detection systems known to the person skilled in the art.

Some are based on inertial sensors, some are based on optical sensors and some are software based.

It is one advantage of the invention that the invention can be used in combination with any of these motion detection systems.

According to another embodiment of the invention, the control electronic is connected to the magnetic field sensors of the tiltable mirror and wherein the control electronic is configured to receive and process the sensor signals from the magnetic field sensors thereby providing a closed-loop control to the optical imaging system for optical image stabilization.

The advantages of a closed-loop system have been elaborated above.

According to another embodiment of the invention, the optical system comprises a field of view that is imaged to the image sensor, wherein the field of view is smaller than 70°, particularly smaller than 30°.

The field of view is measured by means of the imaging aperture that is the full opening angle measured with regard to the optical axis of the system.

In such system the use of the adjustable mirror is particularly advantageous.

According to another aspect of the invention, the invention is related to a handheld computerized device, such as a mobile phone, comprising an optical system according to the invention.

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

In the following, further features as well as embodiments of the present invention are described with reference to the Figures that are appended to the claims, wherein:

Figure 3A:
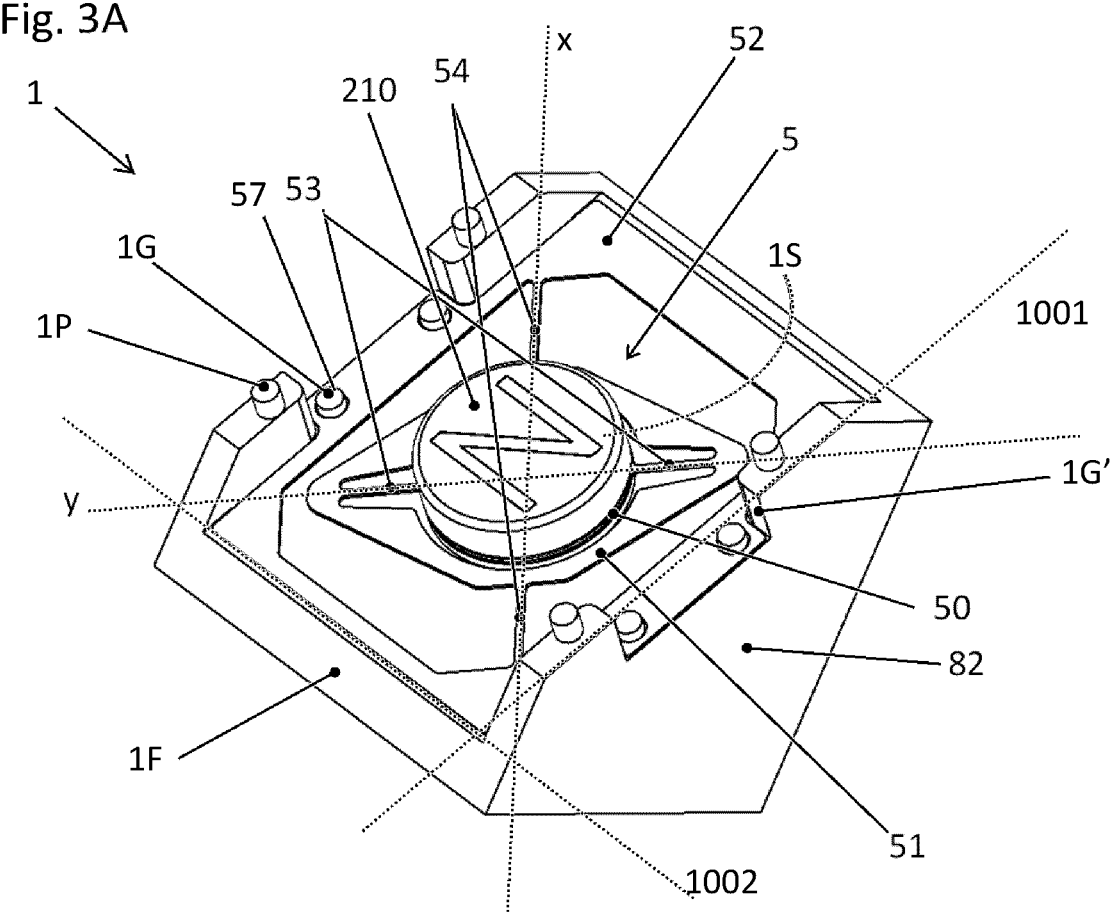
Figure 4A:
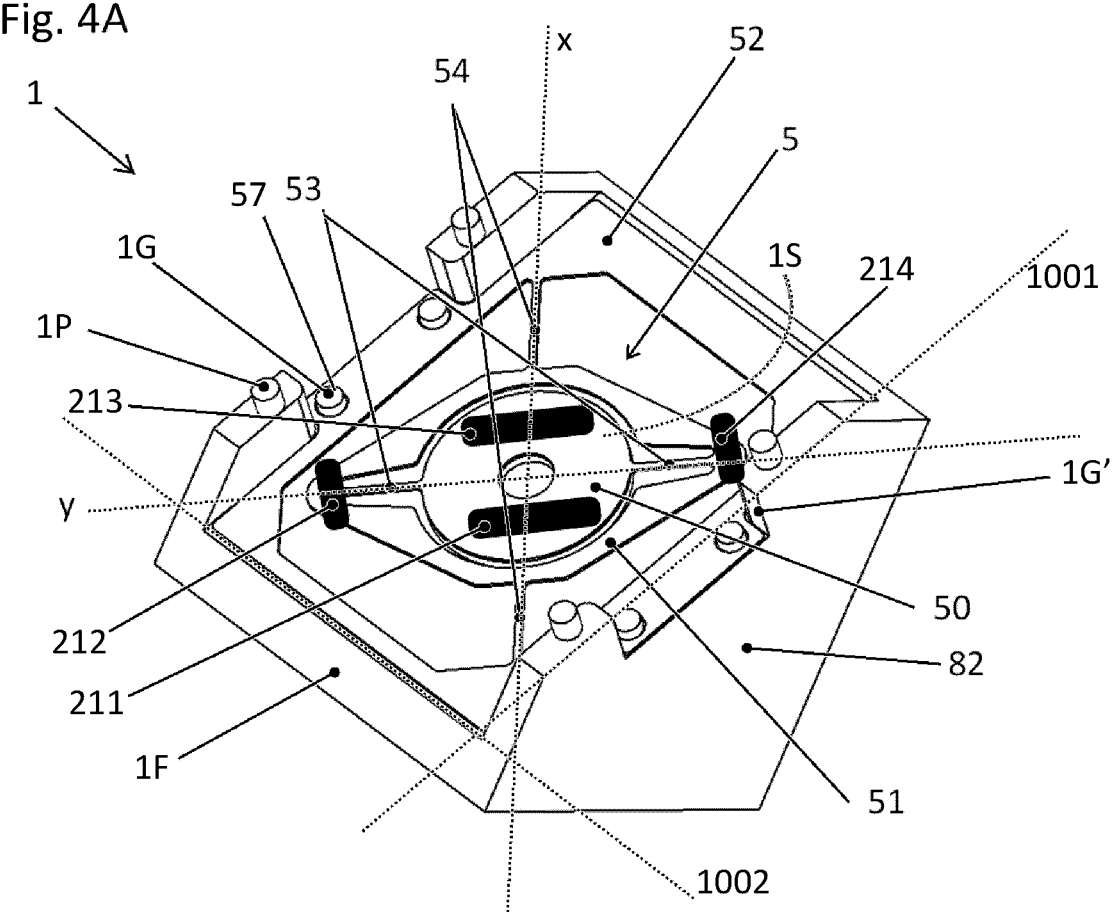
Figure 4B:
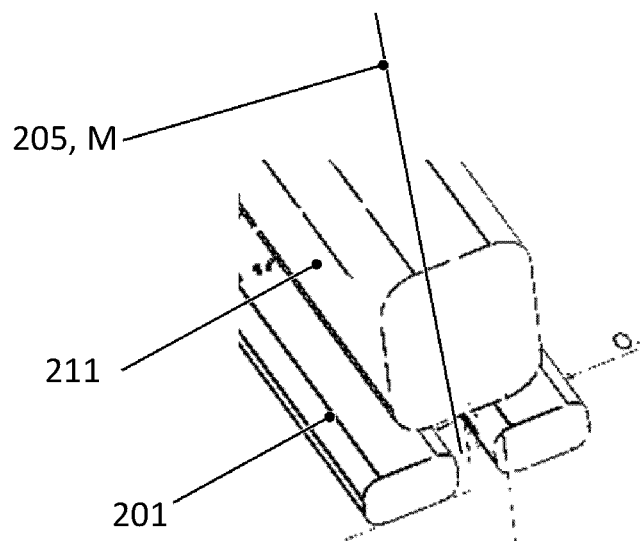
Figure 5A:
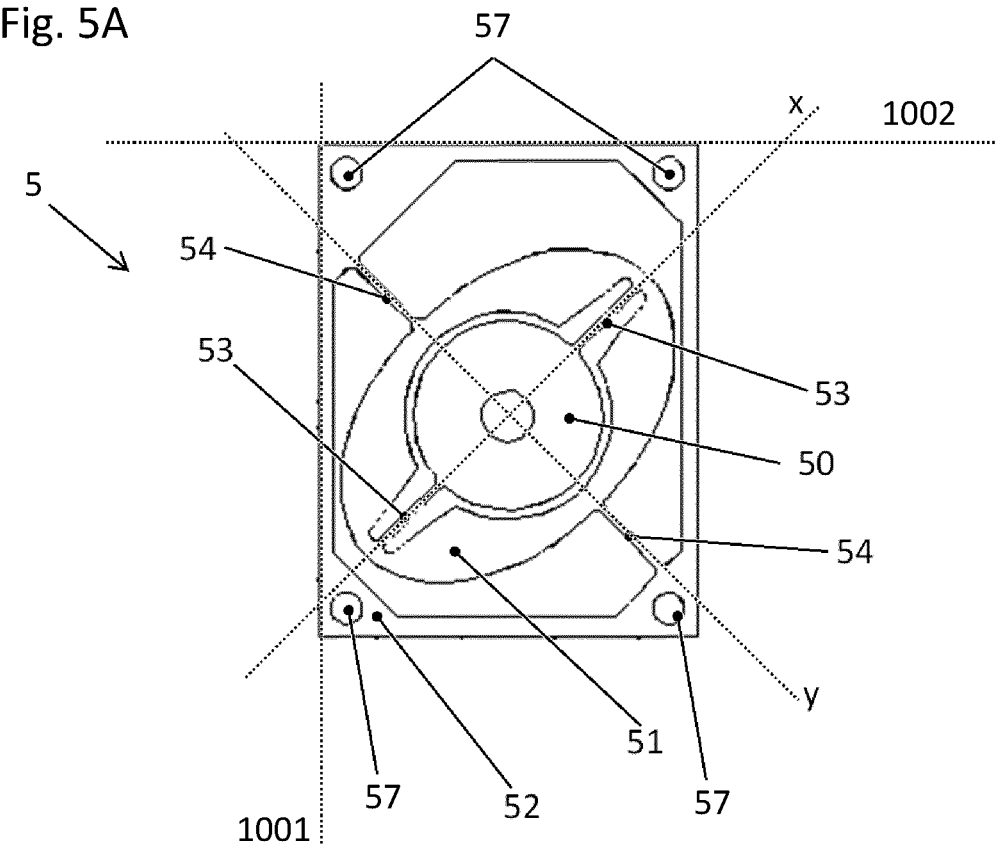
Figure 5B:
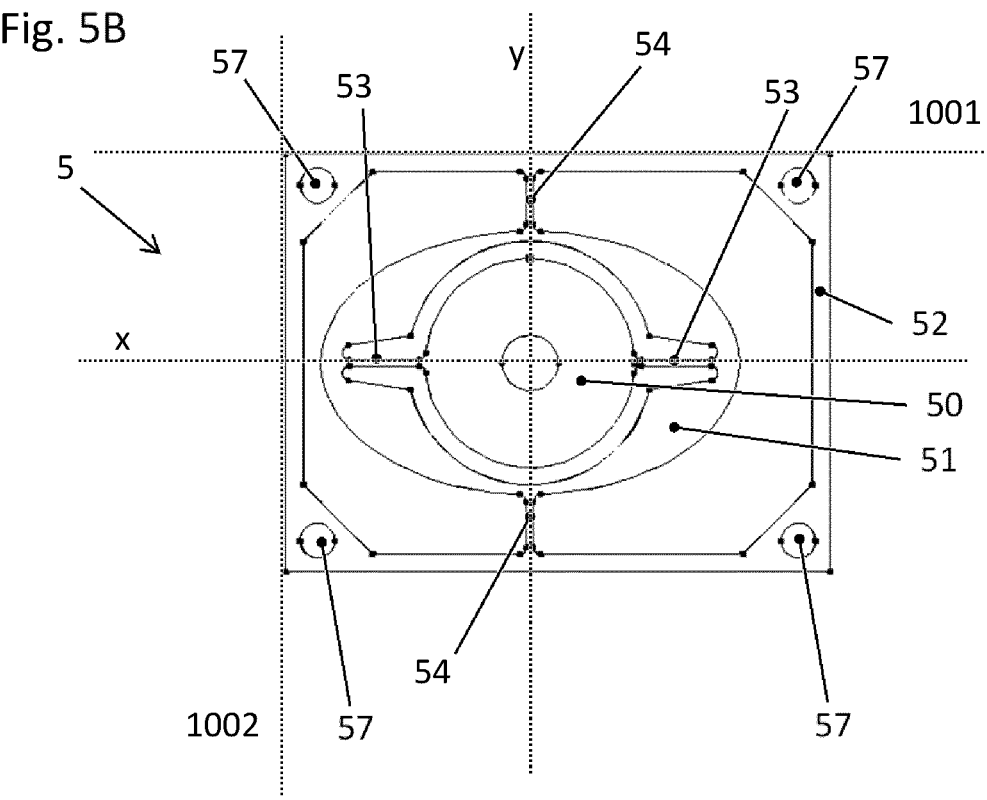
Figure 6A:
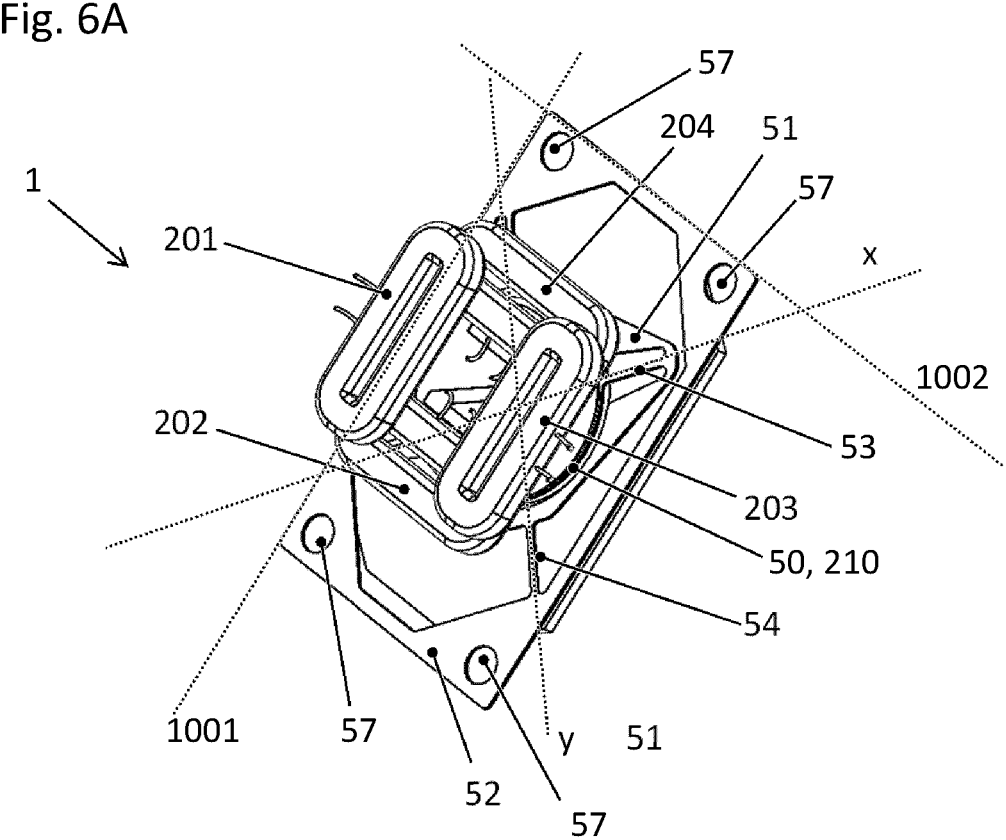
Figure 6B:
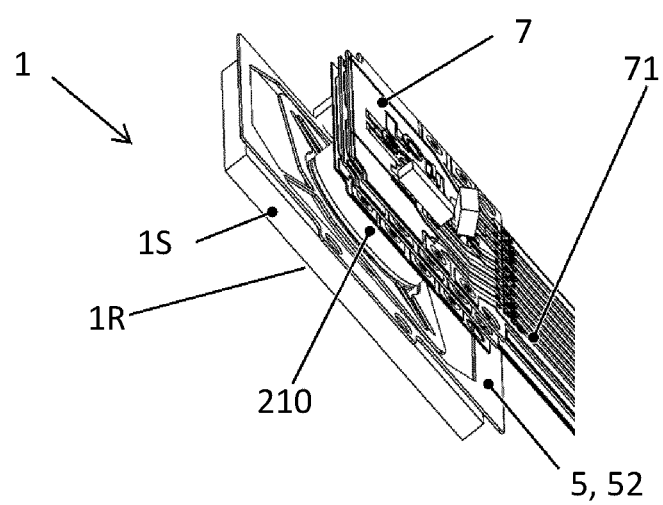
Figure 7:
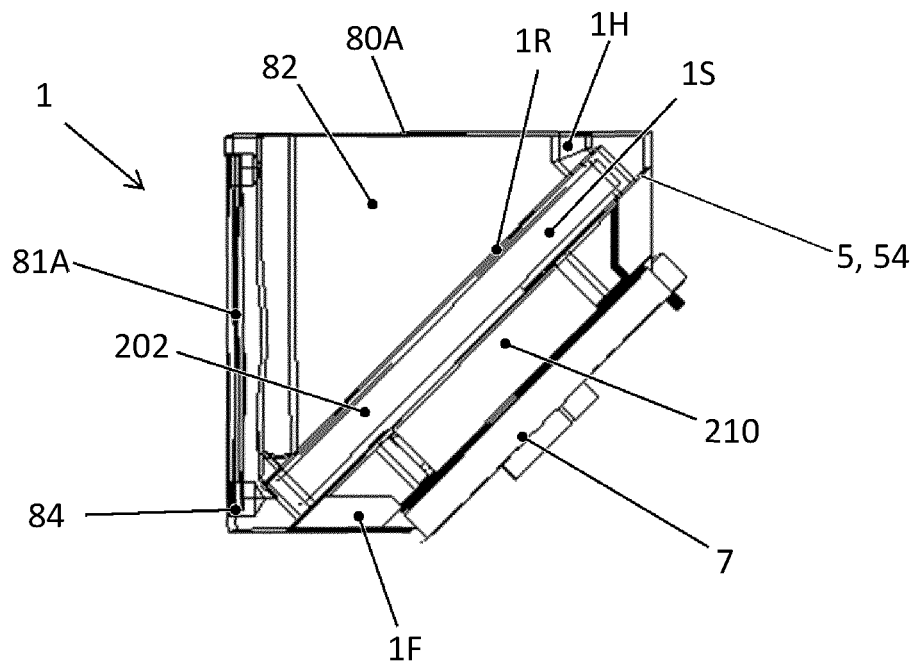
Figure 8A:
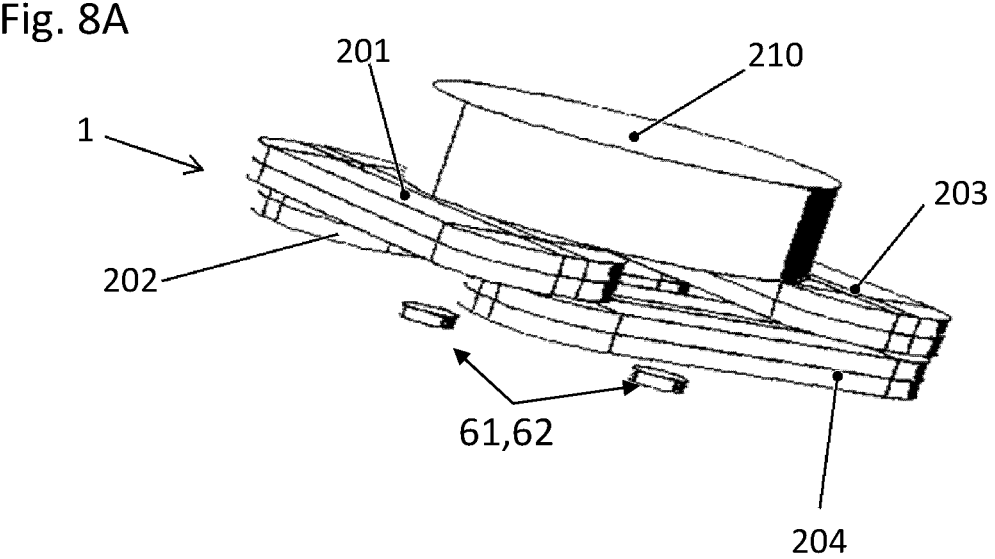
Figure 8B:
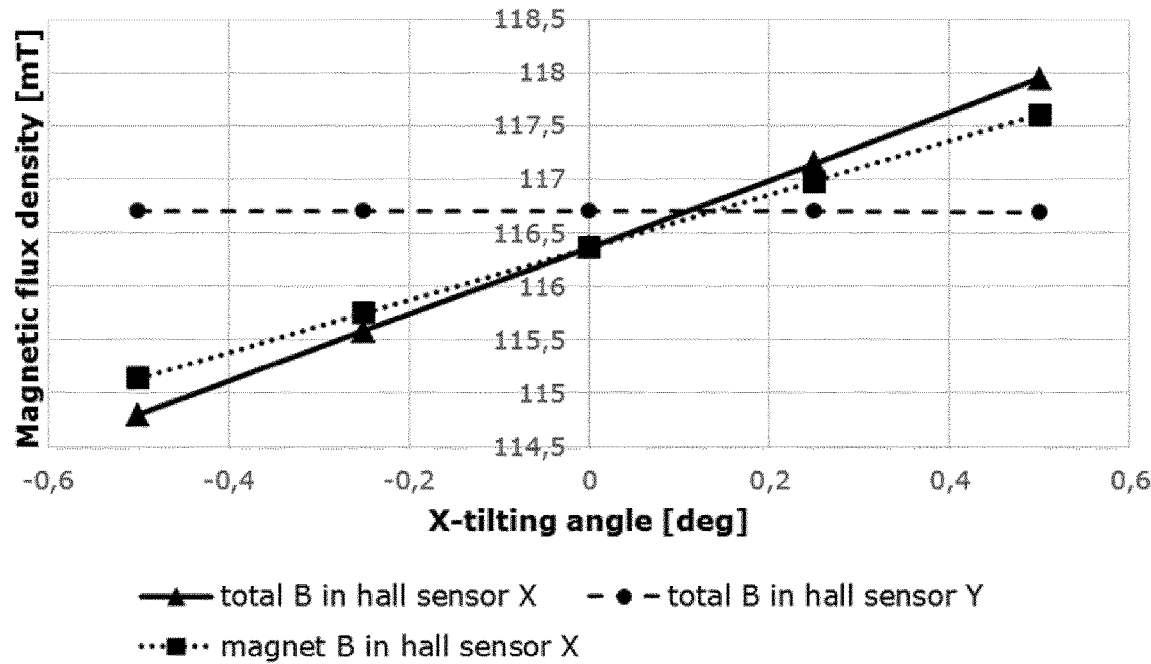
Figure 9A:
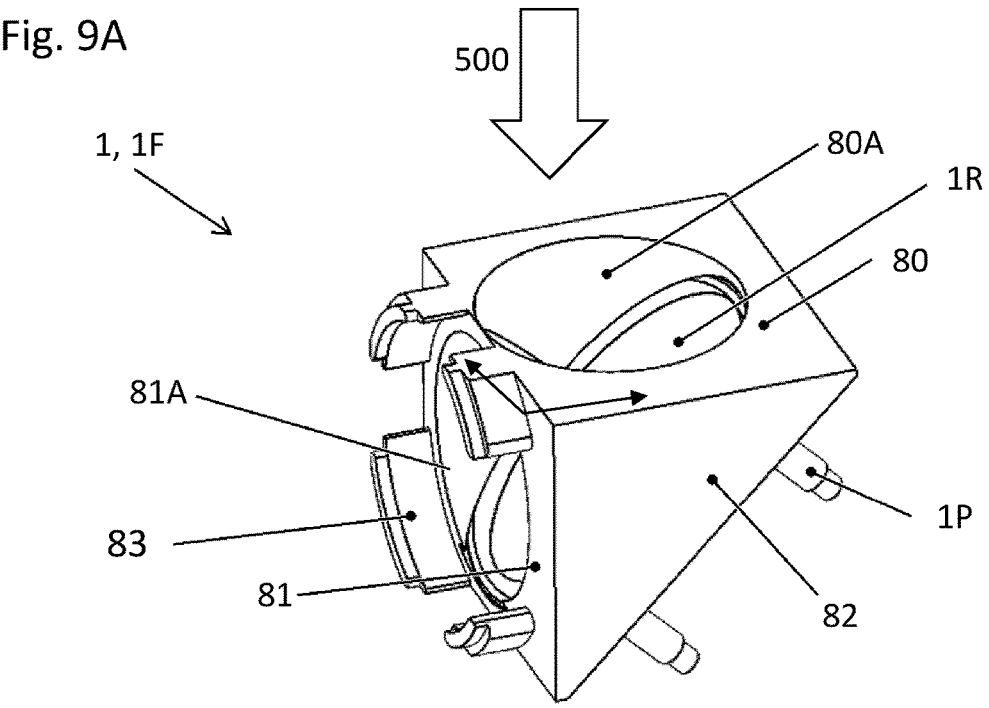
Figure 9B:
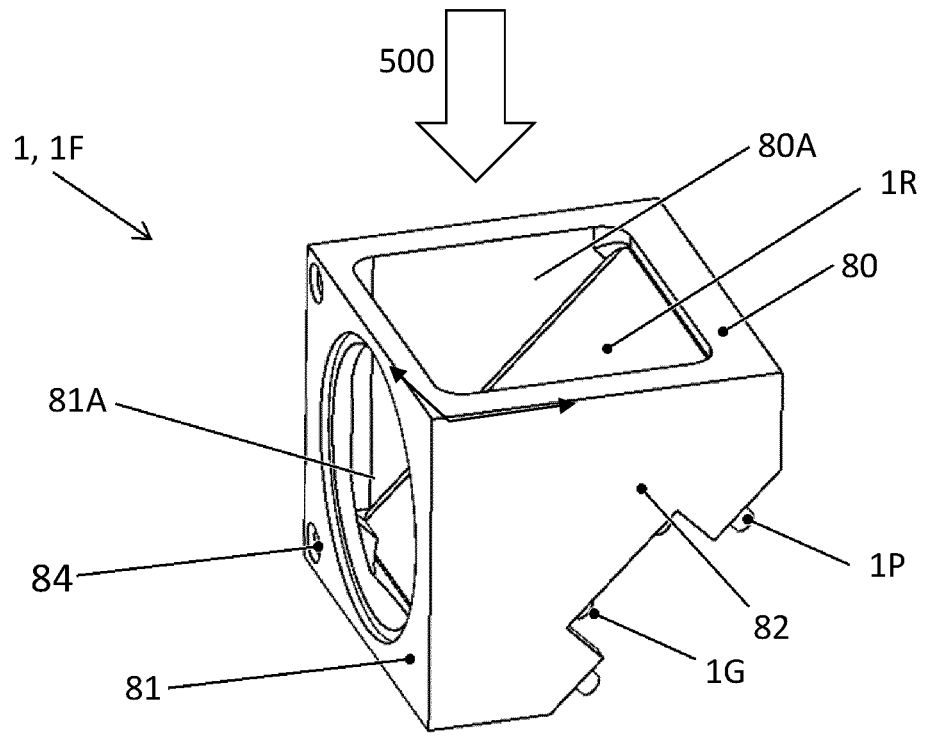
Figure 10:
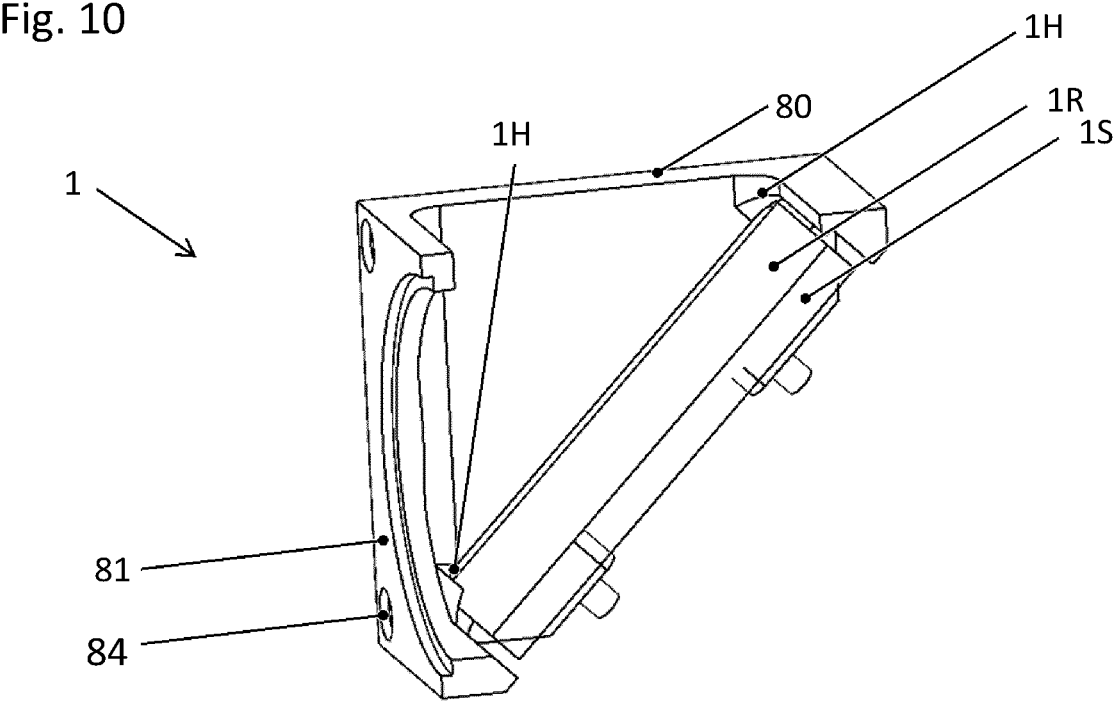

FIG. 3A+B show a schematic drawing of a mirror with a single magnet and a printed circuit board;

FIG. 4A shows a perspective view of the mirror according to the invention with four magnets;

FIG. 4B shows a magnet-coil assembly of the actuator;

FIG. 5A shows one embodiment of a gimbal of the mirror according to the invention;

FIG. 5B shows another embodiment of a gimbal of the mirror according to the invention;

FIG. 6A shows an embodiment with four coils;

FIG. 6B shows an embodiment with a printed circuit board comprising the coils;

FIG. 7 shows an embodiment with a mirror frame formed as a housing;

FIG. 8A shows an embodiment with hall sensors;

FIG. 8B shows simulated measurement data with the hall sensors of FIG. 8A;

FIG. 9A shows an embodiment with a circular inlet aperture of the mirror;

FIG. 9B shows an embodiment with a rectangular inlet aperture of the mirror; and FIG. 10 shows an embodiment with hard stops for protecting the mirror against mechanical shocks.

Figure 1:
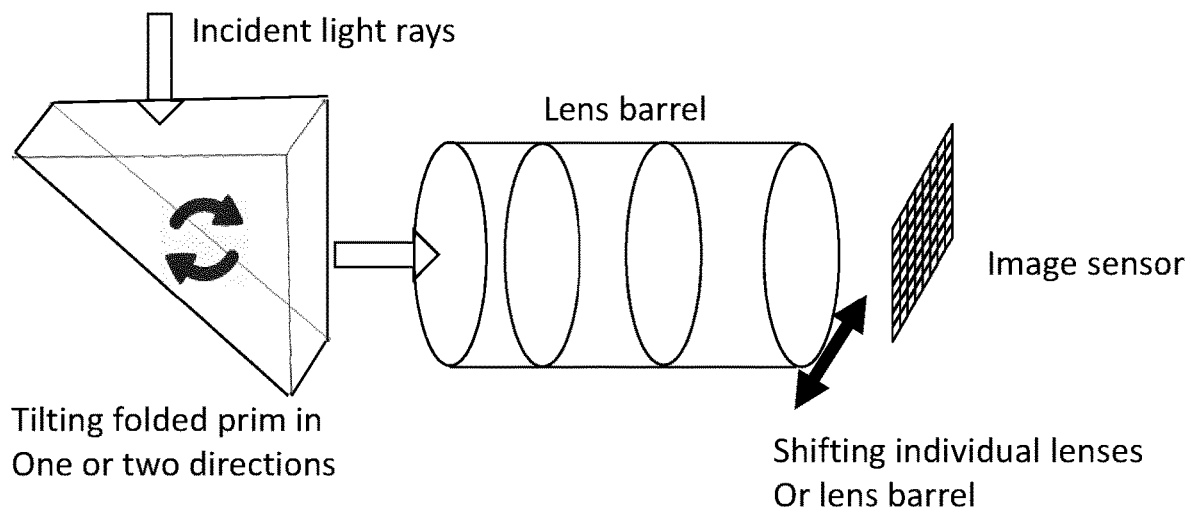
FIG. 1 shows a schematic optical imaging system with a fold prism according to the state of the art.

FIG. 1 shows an imaging system as commonly found in the state of the art. The imaging system comprises an image sensor, a lens system comprised in a rigid lens barrel and a fold prism.

Such optical imaging systems are often comprised in compact handheld devices, such as mobile phones, mobile computer with a camera, where space for components is typically very limited and often required to have the optical path folded by one or more fold prisms.

Optical image stabilization in such system is achieved by moving (as indicated by the solid black arrows) selected components of the imaging system so that an incident light ray is projected to the same position of the image sensor even though the image sensor is moved, e.g. due to a shaking motion of a person holding the imaging system.

In this case either the fold prism is titled or the lens barrel with the lens system is moved transversally to the optical path (indicated by hollow arrows) in order to achieve image stabilization.

There are advantages to tilt the fold prism, as the fold prism has a solid portion e.g. consisting of glass having a higher refractive index than air, thus confining the incident light rays to a higher degree allowing the optical system to be built more compact.

Moreover, tilting the prism is more advantageous than translating the lens barrel, as for each degree the prism is tilted the incident light is reflected by twice said angle, allowing for smaller tilt angles. For a translational movement of the lens barrel this relation does not apply.

However, for actuation the whole prism has to be tilted requiring higher actuation forces and a larger building space for the tiltable prism. This in turn leads to a higher energy consumption of the image stabilization system.

Figure 2:
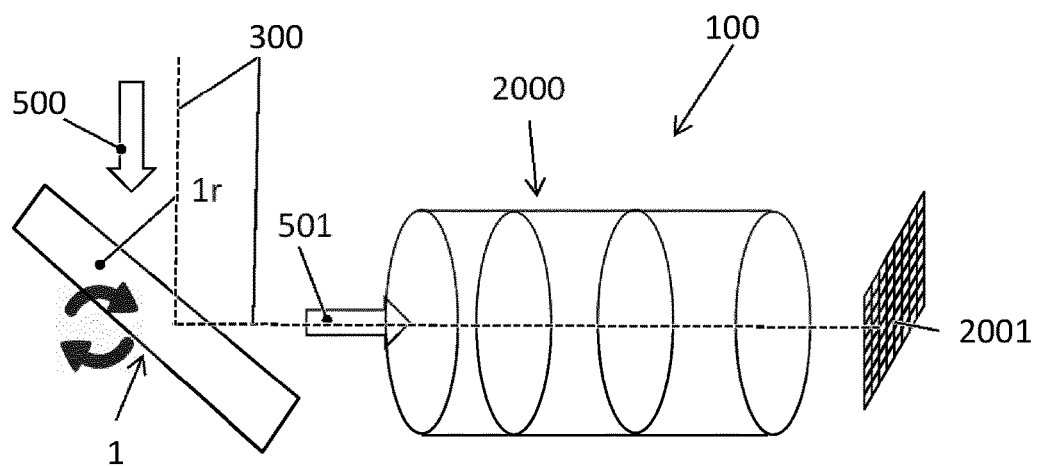
FIG. 2 shows a schematic optical imaging system according to the invention with a fold mirror.

FIG. 2 shows a schematic of an optical imaging system 100 according to the invention, where the fold prism is replaced by a tiltable mirror 1.

The tiltable mirror 1 provides the advantage of having a lighter weight and thus energy consumption is reduced as well as the force requirements for the actuator.

Such a system 100 is particularly advantageous in imaging systems that have a small field of view, e.g. smaller than 30°, such as tele- or zoom-objectives, where the additional light confinement provided by a fold prism is not necessary.

Moreover, lesser wavefront distortion can be expected as the light does not propagate through the prism but is directly reflected by the mirror's reflective surface.

The optical system 100 according to the invention can be combined with a lens having an adjustable focal length (not shown).

In one embodiment, no further optical element is arranged in front (i.e. on the side facing the incident light) of the fold mirror 1 except maybe a planar cover glass or transparent, planar element for providing protection against environmental influences such as dust, humidity, water or the like.

For actuating the tiltable mirror 1 the optical imaging system 100 comprises an actuator 5 (see e.g. FIG. 8A). The actuator is for example a piezo-electric actuator, a solid memory alloy wire-based actuator or an actuator 5 based in inducing a Lorentz force in a tiltable portion 1S of the mirror 1.

Such Lorentz force is typically induced by means of a voice coil actuator.

Figure 3B:
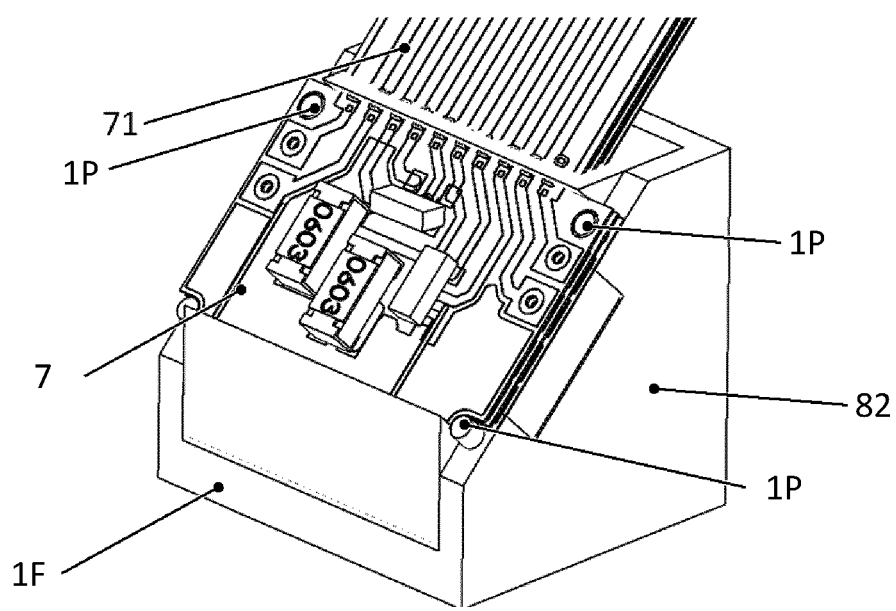

In FIGS. 3A and 3B a tiltable mirror 1 for image stabilization of an optical imaging system 100 according to the invention is shown. FIG. 3A shows a three-dimensional view of the mirror 1 showing a back side of the mirror 1.

The mirror 1 comprises a mirror frame 1F, here in form of a housing, wherein the mirror frame 1 is configured to hold the tiltable portion 1S (not visible from the back side) of the mirror 1.

The tiltable portion 1S is tilted by a two-axis gimbal 5 comprising a central part 50 tiltable around a primary tilt axis x of the gimbal 5, wherein said central part 50 is arranged and enclosed by a first part 51. The two-axis gimbal 5 and the components referred to herein is also shown in FIG. 5A and FIG. 5B. The central part 50 is tiltable about the primary axis x by means of two primary spring arms 53 being the only connecting components between the first part 51 and the central part 50 such that the central part 50 is tiltable relative to the first part 51. The first part 51 in turn is tiltable about a secondary axis y of the gimbal 5 that is given by two secondary spring arms 54. The first part 51 is enclosed by a second part 52 that is connected with the first part 51 only by means of the two secondary spring arms 54, such that the first part 51 is tiltable relative to the second part 52. Whenever the first part 51 is titled about the secondary axis y also the central part 50 is tilted about the secondary axis y.

The two-axis gimbal 5 therefore allows tilting the central part 50 around the primary and the secondary axis x, y.

The two-axis gimbal 5 is formed integrally for example from a metal sheet, such that the four spring arms 53, 54 are formed integrally and provide a restoring force the moment the arms 53, 54 experience a torque.

The restoring force can be assumed linear for small deflection angles that a common for image stabilization applications.

The two-axis gimbal 5 is particularly light-weight and its resonance frequency (with load on the central part or without) as well as its restoring forces, i.e. the spring constant can be adjusted by designing the spring arms 53, 54 and the size of the central 50 and/or first part 51 accordingly.

The spring arms 53, 54 are particularly pin- or sheet-shaped.

The resonance frequencies of the tiltable mirror 1 should be either below 5 Hz or above 30 Hz in order to be able to be well-controllable in the frequency region of 10 Hz, which is a typical frequency region of hand-tremor/hand-induced shaking of a hand-held optical system.

The spring arms 53, 54 can be designed to exhibit a restoring torque (also referred to as restoring force) of ~0.5 mN*mm at 0.5° mechanical tilt.

Such torques can be provided with common voice coil actuators 5.

Moreover, the rigid spring design as disclosed herein ensures high repeatability and little temperature dependency.

The central part 50 of the two-axis gimbal 5 can have a circular shape (as shown in FIGS. 5A and B), wherein the first part 51 can have an elliptical outer contour (e.g. cf. FIG. 5A and FIG. 5B) or a rhombic outer contour (e.g. cf. FIG. 3A).

Alternatively to the elliptical, rhombic or oval shape, the first part 51 can have an outer contour that exhibits an axial symmetry along the secondary axis and/or primary axis x, y.

The second part 52 has particularly a rectangular outer contour matching the contour of the mirror frame 1F, such that it can be attached to the mirror frame 1F.

The specific contour of the first part 51 allows for an arrangement of the gimbal 5 in a rectangular geometry (e.g. in a rectangular second part 52) such that the main axes (e.g. of the ellipse or the rhombus) are not oriented along the sides of the rectangle of the second part 52 (cf. e.g. FIG. 5A or 3A), but an at angle around 45°. This allows for compact mirror frame 1F and gimbal design.

Alternatively, the gimbal's primary and secondary axes can be aligned with the sides of the rectangular mirror frame 1F (e.g. FIG. 5B). This embodiment allows for a particularly slim fold mirror designs for compact optical systems.

The second part 52 of the gimbal 5 has particularly four holes 57 for a defined placement and assembly of the gimbal 5 onto the mirror frame 1F. For this purpose, the mirror frame 1F has corresponding alignment pins 1G matching the holes 57 of the gimbal 5. This allows a rapid and precise assembly of the mirror frame 1F with the gimbal 5.

The mirror substrate 1S comprising the reflective layer 1R is arranged on the central part 50 of the gimbal 5 such that the reflective layer 1R (also referred to as reflective surface) is tiltable about the primary and secondary axis x, y.

FIG. 3A shows a tiltable mirror 1 with a single permanent magnet 210 arranged on a back side of the central part 50 of the gimbal 5. The magnet 210 has a magnetization pointing along a third axis orthogonal to the primary and the secondary axis x, y.

The back side of the central part 50 is the side of the central part 50 facing away from the reflective layer 1R of the mirror substrate 1S.

Alternatively, the tiltable mirror 1 can comprise four magnets 211, 212, 213, 214; a first and a second primary magnet 211, 213 as well as a first and a second secondary magnet 212, 214. This embodiment is shown in FIG. 4.

In FIG. 4A the two primary magnets 211, 213 are arranged on the central part 50, laterally shifted with respect to the primary axis x that is defined by the primary spring arms 53 tiltably connecting the central part 50 with the first part 51.

The two secondary magnets 212, 214 are arranged laterally shifted with respect to the secondary axis y on the first part 51. The secondary axis y is defined by the secondary spring arms 54. Actuation coils 201. 202. 203, 204 acting (not shown) on the respective magnet 211, 212, 213, 214 induce a Lorentz force on the magnets 211, 212, 213, 214 and thus a tilt control around the primary and the secondary axis x, y is achieved.

The corresponding four actuation coils 201, 202, 203, 204 (not shown in FIG. 4A) are arranged on the mirror frame 1F overlapping with the associated magnet 211, 212, 213, 214.

FIG. 4B shows a cross section of one of the four magnets 211 and an associated actuation coil 201. The actuation coils 201, 202, 203, 204 can have a similar or the same outer contour as the magnet 211, 212, 213, 214. In the depicted example, the magnet 211 and the coil 201 have an elongated shape.

The actuation coils 201, 202, 203, 204 comprise an electrically conductive substrate that is extending around a coil axis 205. The coil 201 is arranged such on the mirror frame 1F that the coil axis 205 is oriented essentially along the magnetization M of the magnet 211. This allows an efficient generation of a Lorentz force.

The actuation coil 201, 202, 203, 204 can consist of an electric wire that is wound around the coil axis 205.

In FIG. 6A the two-axis gimbal 5 and four the actuation coils 201, 202, 203, 204 are shown. The mirror frame is not shown, even though the coils 201, 202, 203, 204 are arranged on the mirror frame. On the gimbal 5 one central magnet 210 is arranged on the central part 50. The coils 201, 202, 203, 204 are arranged at an axial distance to the magnet 210 and are arranged in a square around the center of the central part 50 of the gimbal 5 and the magnet 210. The coils 201, 202, 203, 204 extend circumferentially around a coil axis and enclose a coil area perpendicular to said coil axis. The coil area of each coil 201, 202, 203, 204 overlaps with the magnet 210 such that a Lorentz force can be induced in the magnet 201 by each coil 201, 202, 203, 204.

The coils 201, 202, 203, 204 have an elongated shape in the plane defined by the gimbal 5, i.e. the coils 201, 202, 203, 204 don't extend circular around the coil axis.

The coils 201, 202, 203, 204 in this embodiment are not oriented along the primary or secondary axis x, y defined by the orientation of the spring arms 53, 54 of the gimbal 5. Nonetheless, it is straightforwardly possible to control a tilt around a single tilt axis by providing corresponding electric currents to the coils.

Adjacent coils 201, 202, 203, 204 overlap at the corners of the square providing a more compact arrangement.

In FIG. 6B a similar embodiment as in FIG. 6A is shown, however in this embodiment the tiltable mirror 1 comprises a printed circuit board 7 (PCB), wherein the coils are comprised and integrated in the PCB 7. This embodiment allows for a more rapid assembly of the mirror 1. The contacting of the coils is facilitated by the contact pins 71 of the PCB 7.

FIG. 7 shows a similar embodiment as FIG. 6B. In FIG. 7 the mirror frame 1F is shown. The mirror frame 1F is formed as a housing enclosing the mirror substrate 1S.

The housing comprises two side walls 82, an inlet aperture 80A for incident light 500 and an outlet aperture 81A for reflected light 501. The housing provides stability, dust protection as well as means for rapid assembly such as protrusions and recesses formed for corresponding protrusions and recesses such as to assemble the mirror 1 to an optical system 100. The housing can be made from a plastic, a non-magnetic metal, or from magnetic metal for shielding the actuator. The tiltable mirror 1 is very compact and can be used on space sensitive applications.

FIG. 8A shows selected parts of the mirror having a single magnet 210 and four actuation coils 201, 202, 203, 204 arranged for controlling the magnet 210, as elaborated already above. Additionally, the mirror 1 comprises two hall sensors 61, 62 arranged laterally shifted with respect to the primary and secondary axis x, y, wherein each hall sensor 61, 62 is configured to generate a signal for determining tilt angle of the mirror 1, particularly the tilt angle of the reflective surface 1R along the primary or the secondary axis x, y.

These signals can be used for providing a closed-loop control of the tiltable mirror 1 such that the effect of a control signal issued by a controller can be determined by the signals from the hall sensors 61, 62 such that the controller can then further adjust the tilt of the mirror 1.

The hall sensors 61, 62 have to be arranged to be sensitive to a tilt of the mirror substrate 1S, i.e. the at least one magnet 210, and at the same time such that the magnetic field generated by the actuation coils 201, 202, 203, 204 is not detected or only minimally influencing the hall sensor measurement.

For this reason the hall sensors 61, 62 have to be arranged laterally shifted to one of the primary or secondary axis x, y but closer to the primary axis x and secondary axis y than the actuation coils 201, 202, 203, 204. Particularly, the hall sensors 61, 62 have to be arranged outside the coil area.

The registered magnetic field of the hall sensor 61, 62 should comprise more than 20% of the magnetic field generated by the coils 201, 202, 203, 204 at maximum tilt angle. The maximum tilt angle about one axis is for example ±0.5°.

This is shown for example in FIG. 3B. The hall sensors 61, 62 can be arranged on a back side of the PCB 7, the back side facing away from the reflective layer 1R of the mirror substrate 1S.

This allows rapid assembly and contacting of the mirror 1 according to the invention, as contact pins 71 of the PCB 7 can be contacted by a corresponding plug (not shown). Moreover, the PCB 7 can be attached to the mirror frame 1F by means of a pin-recess system 1P that allows assembly of the PCB 7 to the mirror frame 1F only in a predefined position and orientation.

FIG. 8B shows a diagram for the influence of the magnetic field generated by the actuation coils 201, 202, 203, 204 and its effect on the determined tilt angle around one tilt axis/(here x-axis) of the hall sensor 61. On the y-axis of the diagram the magnetic flux density is plotted, wherein on the x-axis of the diagram, the tilt angle about the x-axis is plotted. The dotted line with squares corresponds to the magnetic field flux of the magnet 210, wherein the solid line with triangles corresponds to the magnetic field of the magnet 210 superimposed by the magnetic field of the actuator coil 201, 202, 203, 204 that is registered by the hall sensor 61. The deviation between the lines shows the error induced by the coils magnetic field in the hall sensor signal.

The hall sensor 61 for titling around the other tilt axis is completely unaffected by the tilting around the x-axis (broken line with circles).

For a 3 mm magnet 210 the optimum positions for the hall sensors 61, 62 were found to be 0.9 mm in each direction from the center of the magnet 210 at a distance of 0.8 mm.

FIG. 9 shows a mirror frame 1F in form of a housing, having two light absorbing side walls 82 a back side where the at least one magnet 210 and the coils 201, 202, 203, 204 can be arranged, an opening aperture 80A for incident light 500 as well as an outlet aperture 81A for reflected light.

In FIG. 9B the reflective layer 1R of the mirror 1 is rectangular as well as the inlet aperture 80A, which is superior to traditional circular apertures, as for achieving the same relative illumination the rectangular or square reflective layer can have a smaller width than a corresponding diameter of a circular mirror.

The housing in FIG. 9A has a circular inlet aperture 80A and an oval reflective layer 1R of the mirror 1.

Both housings shown in FIG. 9A and FIG. 9B have a circular outlet aperture 81A, wherein on the side comprising the outlet aperture 81 protrusions 83 (FIG. 9A), for assembling the mirror 1 to an optical system 100 in a well-defined position and for fixing the housing to the optical system e.g. by an adhesive are provided. In FIG. 9B the housing has holes 84 for receiving corresponding assembly pins from the optical system on the outlet aperture 81A side. The protrusions 83 and holes 84 can be formed such that a glue pocket is maintained when the mirror 1 is assembled to the optical system 100, such that an adhesive can be inserted to the glue pocket.

In FIG. 10 a cross-section of the mirror 1 from FIG. 9B is shown. The housing has a plurality of hard stops 1H for limiting the tilt angle of the mirror substrate 1S. The hard stops 1H are arranged at the respective corner close to the mirror substrate 1S. The hard stops 1H can be integrally formed with the mirror frame 1F. The hard stops 1H protect the tiltable mirror 1 against to large tilt angles, e.g. when the tiltable mirror 1 experiences an external mechanical shock.

The invention claimed is:

1. A tiltable mirror for optical image stabilization in an optical imaging system, the tiltable mirror comprising
    a rigid mirror substrate with a planar reflective layer on a front side of the mirror substrate for reflecting incident light in an optical imaging system,
    a mirror frame, wherein the mirror substrate is arranged tiltably in the mirror frame,
    an actuator for tilting the mirror substrate around a primary and a secondary tilt axis with respect to the mirror frame,
    wherein the actuator is configured to generate a Lorentz force for tilting the mirror substrate, wherein the actuator comprises at least one permanent magnet rigidly arranged on a back side of the mirror substrate opposite the reflective layer, and a plurality of actuation coils for tilting the mirror substrate around the primary and the secondary axis
    wherein the plurality of actuation coils comprises at least a first primary actuation coil arranged for tilting the mirror substrate at least around the primary axis, and at least a first secondary actuation coil arranged for tilting the mirror substrate at least around the secondary axis,
    wherein the first primary coil is arranged laterally shifted with respect to the primary axis on the mirror frame and wherein the first secondary actuation coil is arranged laterally shifted with respect to the secondary axis on the mirror frame,
    wherein the tiltable mirror comprises a plurality of magnets rigidly arranged on the back side of the mirror substrate, wherein the magnets are configured for actuating the mirror substrate by means of a Lorentz force, wherein the plurality of magnets comprises a first and a second primary magnet as well as a first and a second secondary magnet, wherein the first primary magnet is arranged laterally shifted with respect to the primary axis on the mirror substrate, wherein the second primary magnet is arranged laterally shifted to the primary axis and opposite of the first primary magnet, wherein the first secondary magnet is arranged laterally shifted with respect to the secondary axis on the mirror substrate (1S), wherein the second secondary magnet is arranged laterally shifted to the secondary axis and opposite of the first secondary magnet, each magnet having associated a corresponding actuation coil arranged on the mirror frame.

2. The tiltable mirror according to claim 1, wherein the at least one magnet is centered at an intersection of the primary and the secondary axis.

3. The tiltable mirror according to claim 1, wherein the actuator comprises a second primary actuation coil and a second secondary actuation coil, wherein the second primary actuation coil is arranged for tilting the mirror substrate at least around the primary axis and wherein the second secondary actuation coil is arranged for tilting the mirror substrate at least around the secondary axis, wherein the second primary actuation coil is arranged opposite of the first primary actuation coil on the mirror frame, wherein the second secondary actuation coil is arranged opposite of the first secondary actuation coil.

4. The tiltable mirror according to claim 3, wherein the first and the second primary actuation coil are arranged symmetrically in a plane extending parallel the secondary and the primary axis, and/or wherein the first and the second secondary actuation coil are arranged symmetrically in a plane extending parallel to the secondary and the primary axis.

5. The tiltable mirror according to claim 2, wherein the actuation coils are arranged on a back side of the mirror frame.

6. The tiltable mirror according to claim 1, wherein the actuation coils are arranged such that the actuation coils superimpose the at least one magnet at least partially.

7. The tiltable mirror according to claim 1, wherein the magnets are arranged symmetrically to each other.

8. The tiltable mirror according to claim 1, wherein the first primary actuation coil is arranged on the mirror frame opposite the first primary magnet on the mirror substrate, the second primary actuation coil is arranged on the mirror frame opposite the second primary magnet on the mirror substrate, the first secondary actuation coil is arranged on the mirror frame opposite the first secondary magnet on the mirror substrate, and/or
    the second secondary actuation coil is arranged on the mirror frame opposite the second secondary magnet on the mirror substrate.

9. The tiltable mirror according to claim 1, wherein mirror comprises a printed circuit board arranged at the mirror frame, wherein the printed circuit board comprises the actuation coils and the first and the second magnetic field sensor.

10. An optical imaging system, comprising the tiltable mirror according to claim 1, an image sensor and a lens system for imaging, the lens system having an optical axis defining an optical axis of the imaging system, wherein the lens system is arranged in front of the image sensor with a first side and wherein the tiltable mirror is arranged at a second side of the lens system opposite the first side, wherein the optical axis of the imaging system is folded by the tiltable mirror, wherein the tiltable mirror is configured to tilt the reflective layer in response to a movement of the optical imaging system such that an incident ray of light maintains its projected position on the image sensor thereby providing optical image stabilization to the optical imaging system.

11. The optical imaging system according to claim 10, wherein the optical imaging system comprises at least one lens that has an adjustable focal length, wherein said lens comprises a container filled with a transparent fluid, wherein the container comprises an elastically deformable and transparent membrane facing a transparent bottom portion of the container.

12. The optical imaging system according to claim 10, wherein the imaging system comprises a motion detection means for detecting a movement of the optical system, wherein said motion detection means is configured to generate a motion signal indicative of the detected motion and its direction, wherein the optical imaging system further comprises a control electronic wherein said control electronic is configured to generate a control signal for controlling a tilt position of the reflective layer of the tiltable mirror, said control signal being configured to tilt the reflective layer in response to a movement, providing an active control to the optical imaging system for optical image stabilization, wherein the control electronic is connected to the magnetic field sensors of the tiltable mirror and wherein the control electronic is configured to receive and process the sensor signals from the magnetic field sensors thereby providing a closed-loop control to the optical imaging system for optical image stabilization.

13. The optical imaging system according to claim 10, wherein the actuator is configured to tilt the reflective layer in response to a movement of the optical imaging system such that an incident ray of light maintains its projected position on the image sensor thereby providing optical image stabilization to the optical imaging system.

14. A tiltable mirror for optical image stabilization in an optical imaging system, the tiltable mirror comprising
a rigid mirror substrate with a planar reflective layer on a front side of the mirror substrate for reflecting incident light in an optical imaging system,
a mirror frame, wherein the mirror substrate is arranged tiltably in the mirror frame,
an actuator for tilting the mirror substrate around a primary and a secondary tilt axis with respect to the mirror frame,
wherein the actuator is configured to generate a Lorentz force for tilting the mirror substrate, wherein the actuator comprises at least one permanent magnet rigidly arranged on a back side of the mirror substrate opposite the reflective layer, and a plurality of actuation coils for tilting the mirror substrate around the primary and the secondary axis wherein the plurality of actuation coils comprises at least a first primary actuation coil arranged for tilting the mirror substrate at least around the primary axis, and at least a first secondary actuation coil arranged for tilting the mirror substrate at least around the secondary axis, wherein the first primary coil is arranged laterally shifted with respect to the primary axis on the mirror frame and wherein the first secondary actuation coil is arranged laterally shifted with respect to the secondary axis on the mirror frame wherein the mirror substrate is arranged on a two-axis gimbal connected to the mirror frame allowing for independently tilting the mirror substrate in the mirror frame around the primary and the secondary axis, wherein the two-axis gimbal comprises a spring means that comprises a central part comprising the mirror substrate, wherein the central part is integrally connected to a circumferential first part surrounding the central part such that the central part can be tilted about the primary axis with respect to the first part, and wherein the first part is integrally connected to a circumferential second part surrounding the first part so that the first part together with the central part can be tilted with respect to the second part about the secondary axis, wherein the mirror with the two-axis gimbal comprises a resonance frequency for moving the mirror substrate below 5 Hz or above 30 Hz.

15. The tiltable mirror according to claim 14, wherein the first part has an elliptical, rhombic or an oval outer circumference.

16. The tiltable mirror according to claim 14, wherein the second part of the gimbal has a rectangular outer circumference attached to the mirror frame, wherein the rectangular outer circumference of the second part has a first axis of extend of the rectangle extending along two parallel sides of the rectangular circumference and a second axis orthogonal to the first axis, wherein the primary axis and the secondary axis, wherein the rectangular outer circumference of the second part has a first axis of extend of the rectangle extending along two parallel sides of the rectangular contour and a second axis orthogonal to the first axis, wherein the primary axis and the secondary axis.

17. An optical imaging system, comprising the tiltable mirror according to claim 14, an image sensor and a lens system for imaging, the lens system having an optical axis defining an optical axis of the imaging system, wherein the lens system is arranged in front of the image sensor with a first side and wherein the tiltable mirror is arranged at a second side of the lens system opposite the first side, wherein the optical axis of the imaging system is folded by the tiltable mirror, wherein the tiltable mirror is configured to tilt the reflective layer in response to a movement of the optical imaging system such that an incident ray of light maintains its projected position on the image sensor thereby providing optical image stabilization to the optical imaging system.

18. A tiltable mirror for optical image stabilization in an optical imaging system, the tiltable mirror comprising
a rigid mirror substrate with a planar reflective layer on a front side of the mirror substrate for reflecting incident light in an optical imaging system,
a mirror frame, wherein the mirror substrate is arranged tiltably in the mirror frame,
an actuator for tilting the mirror substrate around a primary and a secondary tilt axis with respect to the mirror frame,
wherein the actuator is configured to generate a Lorentz force for tilting the mirror substrate, wherein the actuator comprises at least one permanent magnet rigidly arranged on a back side of the mirror substrate opposite the reflective layer, and a plurality of actuation coils, for tilting the mirror substrate around the primary and the secondary axis wherein the plurality of actuation coils comprises at least a first primary actuation coil arranged for tilting the mirror substrate at least around the primary axis, and at least a first secondary actuation coil arranged for tilting the mirror substrate at least around the secondary axis,
wherein the first primary coil is arranged laterally shifted with respect to the primary axis on the mirror frame and wherein the first secondary actuation coil is arranged laterally shifted with respect to the secondary axis on the mirror frame, wherein the mirror comprises a first and a second magnetic field sensor, wherein the magnetic field sensors are arranged on the mirror frame, wherein the first magnetic field sensor is arranged laterally shifted with respect to the primary axis, wherein the second magnetic field sensor is shifted with respect to the secondary axis.

19. The tiltable mirror according to claim 18, wherein the first and the second magnetic field sensor are arranged laterally shifted with respect to the actuation coils, wherein the first magnetic field sensor is configured to provide sensor data indicative of a tilt angle of the mirror substrate with respect to the mirror frame around the primary axis, wherein the second magnetic field sensor is configured to provide sensor data indicative of a tilt angle of the mirror substrate with respect to the mirror frame (1F) around the secondary axis.

20. An optical imaging system, comprising the tiltable mirror according to claim 18, an image sensor and a lens system for imaging, the lens system having an optical axis defining an optical axis of the imaging system, wherein the lens system is arranged in front of the image sensor with a first side and wherein the tiltable mirror is arranged at a second side of the lens system opposite the first side, wherein the optical axis of the imaging system is folded by the tiltable mirror, wherein the tiltable mirror is configured to tilt the reflective layer in response to a movement of the optical imaging system such that an incident ray of light maintains its projected position on the image sensor thereby providing optical image stabilization to the optical imaging system.

* * * * *